(12) United States Patent
Seymour et al.

(10) Patent No.: US 6,216,086 B1
(45) Date of Patent: Apr. 10, 2001

(54) DRIVER PREFERENCE RESPONSIVE VEHICLE ROUTE PLANNING SYSTEM

(75) Inventors: Leslie G. Seymour, Barrington; Michael Barnea; Allan Kirson, both of Highland Park, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/213,839

(22) Filed: Mar. 16, 1994

Related U.S. Application Data (63) Continuation of application No. 07/786,867, filed on Nov. 1, 1991, now abandoned.

(51) Int. Cl.[7] .................................................. G06G 7/78
(52) U.S. Cl. ........................ 701/202; 701/208; 701/209
(58) Field of Search ............................. 364/424.02, 443, 364/449, 424.01, 436, 437, 438, 444; 340/905, 995, 988, 990; 395/900, 905

(56) References Cited

U.S. PATENT DOCUMENTS

| | | | |
|---|---|---|---|
| 4,796,189 | 1/1989 | Nakayama et al. | 701/209 |
| 4,809,175 * | 2/1989 | Hosaka et al. | 701/98 |
| 4,926,336 | 5/1990 | Yamada | 701/202 |
| 4,984,168 * | 1/1991 | Neukrichner et al. | 701/210 |
| 5,130,709 * | 7/1992 | Toyama et al. | 340/995 |
| 5,164,904 * | 11/1992 | Sumner | 701/117 |

OTHER PUBLICATIONS

"Making Computers Think Like People," Lotfi A. Zadeh, IEEE Spectrum, Aug.1984.*
"An Experimental Study on Fuzzy Parking Control Using a Model Car," M. Sugeno and K. Murakami, Industrial Applications of Fuzzy Control, 1985.*
"Mobile Robot Map Updating Using Attributed Fuzzy Tournament Matching," Adnan Shaout and Can Isik, SPIE vol. 1192 Intelligent Robots and Computer Vision VIII; Algorithms and Techniques, 1989.*
"Autoroute Software Guide," Version 1.1, Feb. 1988.*
Fuzzy Logic Simplifies Complex Control Problems, Tom Williams, Computer Design, Mar. 1, 1991.
Knowledge Representation in Fuzzy Logic, Lotfi A. Zadeh, IEEE Transactions on Knowledge and Data Engineering, vol. 1, No. 1, Mar. 1989.
Fuzzy Systems and Applications United Signals and Systems Inc., Bart Kosko with Fred Watkins, Jun. 5–7, 1991.
A Fuzzy Algorithm for Path Selection in Autonomous Vehicle Navigation, Richard P. Hogle and Piero P. Bonissore, Proceedings on Decision and Control, 1984, IEEE.
Intelligent Identification and Control For Autonomous Guided Vehicles Using Adaptive Fuzzy–Based Algorithms, C. J. Harris, and C. G. Moore, Engineering Application of AI 1989, vol. 2 Dec.
Prototype for a Land Based Automatic Vehicle Location and Navigation System, a Thesis by Clyde B. Harris, submitted to the Department of Surveying Engineering, Calgary, Alberta, Dec. 1989.
Data Fusion in Pathfinder and TravTek, Roy Summer, paper presented at the VNIS '91 Conference on Oct. 20–23, Dearborn, Mi.

* cited by examiner

*Primary Examiner*—Kevin J. Teska
*Assistant Examiner*—Russell W. Frejd
(74) *Attorney, Agent, or Firm*—Nick Hopmann; John J. King (57) ABSTRACT

A vehicle route planning system takes a trip origin location and a trip destination location provided by the driver then considers alternative routes, taken from a map (107), between the trip origin location and trip destination location. Certain attributes, such as traffic congestion and concentration intensity, and driver preferences are considered in a fuzzy inferencing device for planning a preferred route.

14 Claims, 5 Drawing Sheets

| | 503 DRIVER CONGESTION TOLERANCE | 505 DRIVER CONCENTRATION INTENSITY TOLERANCE | 507 EMERGENCY TRIP |
|---|---|---|---|
| 501 TRIP 1 | 10 | 0 | 0 |
| 509 TRIP 2 | 5 | 5 | 0 |
| 517 TRIP 3 | 0 | 10 | 10 |

FIG. 6

| | 603 VEHICLE DENSITY | 607 CONGESTED | 617 NOT CONGESTED | 619 VERY CONGESTED | 621 NOT VERY CONGESTED | 605 UNCONGESTED TRAVEL TIME | 609 CONGESTED TRAVEL TIME |
|---|---|---|---|---|---|---|---|
| 601 ROUTE 1 | 1.5 | 0.6 | 0.4 | 0 | 1 | 8 MIN. | 16 MIN. |
| 613 ROUTE 2 | 2.2 | 1 | 0 | 0.2 | 0.8 | 5 MIN. | 10 MIN. |
| 615 ROUTE 3 | 2.7 | 1 | 0 | 0.8 | 0.2 | 6 MIN. | 12 MIN. |

FIG. 11

| | 1103 SELECT CONSEQUENCE | 1105 EXCLUDE CONSEQUENCE | 1117 BLENDING | 1115 FINAL SELECTION |
|---|---|---|---|---|
| 1101 ROUTE 1 | 0.4, 0.4 | 0 | 0.4−0=0.4 | SELECT ROUTE 1 |
| 1107 ROUTE 2 | 0.4 | 0.2, 0.2 | 0.4−0.2=0.2 | EXCLUDE ROUTE 2 |
| 1109 ROUTE 3 | 0.3 | 0.8, 0.8 | 0.3−0.8=−0.5 | EXCLUDE ROUTE 3 |

FIG. 9

RULE C

| | ANTECEDENT CLAUSE 1: IF A ROUTE IS CONGESTED | ANTECEDENT CLAUSE 2: AND IF AN ALTERNATE ROUTE IS NOT CONGESTED | ANTECEDENT CLAUSE 3: AND IF THE DERIVED TRAVEL TIME OF THE CONGESTED ROUTE IS SHORTER | ANTECEDENT CLAUSE 4: AND IF THE DRIVER HAS A TOLERANCE TO CONGESTION | SELECT CONSEQUENCE: THEN SELECT THE CONGESTED ROUTE | EXCLUDE CONSEQUENCE | WHICH ROUTE? |
|---|---|---|---|---|---|---|---|
| ROUTE 1 VS ROUTE 2 | 0.6 | 0 | 0 903 | 0.5 911 | 0 | | ROUTE 1 |
| ROUTE 1 VS ROUTE 3 | 0.6 | 0 | 0 | 0.5 913 | 0 | | ROUTE 1 |
| ROUTE 2 VS ROUTE 1 | 1 | 0.4 907 | 0.8 | 0.5 | 0.4 | | ROUTE 2 |
| ROUTE 2 VS ROUTE 3 | 1 | 0 | 0 | 0.5 | 0 | | ROUTE 2 |
| ROUTE 3 VS ROUTE 1 | 1 | 0.4 | 0.3 | 0.5 | 0.3 | | ROUTE 3 |
| ROUTE 3 VS ROUTE 2 | 1 | 0 | 0 | 0.5 | 0 | | ROUTE 3 |

FIG. 10

RULE D

| | ANTECEDENT CLAUSE 1: IF A ROUTE IS CONGESTED | ANTECEDENT CLAUSE 2: AND IF AN ALTERNATE ROUTE IS NOT CONGESTED | ANTECEDENT CLAUSE 3: AND IF THE TRIP IS NOT AN EMERGENCY TRIP | ANTECEDENT CLAUSE 4: AND IF THE DRIVER HAS NO TOLERANCE TO CONGESTION | SELECT CONSEQUENCE: THEN SELECT THE NOT CONGESTED ROUTE | EXCLUDE CONSEQUENCE | WHICH ROUTE? |
|---|---|---|---|---|---|---|---|
| ROUTE 1 VS ROUTE 2 | 0.6 | 0 | 1 | 0.5 | 0 | | ROUTE 2 |
| ROUTE 1 VS ROUTE 3 | 0.6 | 0 | 1 | 0.5 | 0 | | ROUTE 3 |
| ROUTE 2 VS ROUTE 1 | 1 | 0.4 | 1 | 0.5 1001 | 0.4 | | ROUTE 1 |
| ROUTE 2 VS ROUTE 3 | 1 | 0 | 1 | 0.5 | 0 | | ROUTE 3 |
| ROUTE 3 VS ROUTE 1 | 1 | 0.4 | 1 | 0.5 1003 | 0.4 | | ROUTE 1 |
| ROUTE 3 VS ROUTE 2 | 1 | 0 | 1 | 0.5 | 0 | | ROUTE 2 |

DRIVER PREFERENCE RESPONSIVE VEHICLE ROUTE PLANNING SYSTEM

This is a continuation of application Ser. No. 07/786,867, filed Nov. 1, 1991 and now abandoned.

FIELD OF THE INVENTION

This invention is directed generally to the field of navigation, and more particularly to a system for vehicle route planning. The present invention is related to U.S. patent application Ser. No. 07/786,500 AN IMPROVED ACCURACY SENSORY SYSTEM FOR VEHICLE NAVIGATION, Seymour et. al. and to U.S. patent application Ser. No. 07/786,450 A VEHICLE ROUTE GUIDANCE SYSTEM, Seymour et. al., both of which were filed on the same date herewith and are assigned to the assignee of the present invention.

BACKGROUND OF THE INVENTION

Modern vehicular navigation systems combine map databases and dead-reckoning navigation methods with various vehicle route planning schemes in order to route the driver from an initial location to a desired destination location. The vehicle route planning scheme typically has access to a network of road segments in a map database. The initial vehicle location and destination vehicle location are specified before the commencement of each trip. The vehicle route planning scheme plans the route by concatenating road segments to complete a route. Contemporary systems are crisp in nature and do not compensate vehicle route planning for driver preferences such as avoidance of undesired route congestion or the demand for concentration, or concentration intensity, on the driver's part. Also while a route may be the shortest possible, in the case of an emergency, the driver may be better served by taking a longer, faster route. Furthermore, a driver may not like to turn left at any intersection on Friday afternoon when traffic is intense. If the driver wanted to take the scenic route there is no provision in contemporary systems to do so. Although these preferences are important to the driver, analytical or crisp methods of route planning are resource prohibitive for a complete solution to be implemented.

SUMMARY OF THE INVENTION

A vehicle route planning system includes a provided trip origin location and a trip destination location and considers first and second routes, taken from a map, between the trip origin location and the trip destination location and includes first and second attributes and determined driver preferences in a model free selection of a preferred route.

BRIEF DESCRIPTION OF THE DRAWINGS

The present invention will be effectively comprehended when read with the aid of the accompanying drawings in which.

DETAILED DESCRIPTION OF A PREFERRED EMBODIMENT

In a preferred embodiment we disclose a system for considering route attribute and driver preferences in order to improve the convenience of the route planned by the route planning mechanism in an on-vehicle navigation system. The route attributes are represented in a digital map database that includes congested travel time and uncongested travel time and can include historical route congestion, and concentration intensity. The driver preferences are defined by the vehicle driver and include, driver tolerance to congestion, driver tolerance to concentration intensity and a parameter describing a trip's emergency. Alternatively these driver preferences can be provided by historical data, or derived from past driving habits, or defined by other people. The route attributes and driver preferences are all coupled to a navigation computer with a model free mechanism, in this case a fuzzy inferencing engine, designed to select a most convenient, or preferred, route. Of course, it would be obvious to one with ordinary skill in the art to substitute another model free means such as a neural network, genetic learning method, or other model derivable from observations directly rather than by analytical methods. A model free means, as it applies here, is a technique for estimating input-output functions, or stimulus-response associations based on a non-analytic means.

The preferred embodiment applies fuzzy inferencing, based on fuzzy sets, as described by Lotfi Zadah in his landmark treatise "Fuzzy Sets", published in Information and Control, Vol. 8, pages 338–353, by the Academic Press, 1965.

Figure 1:
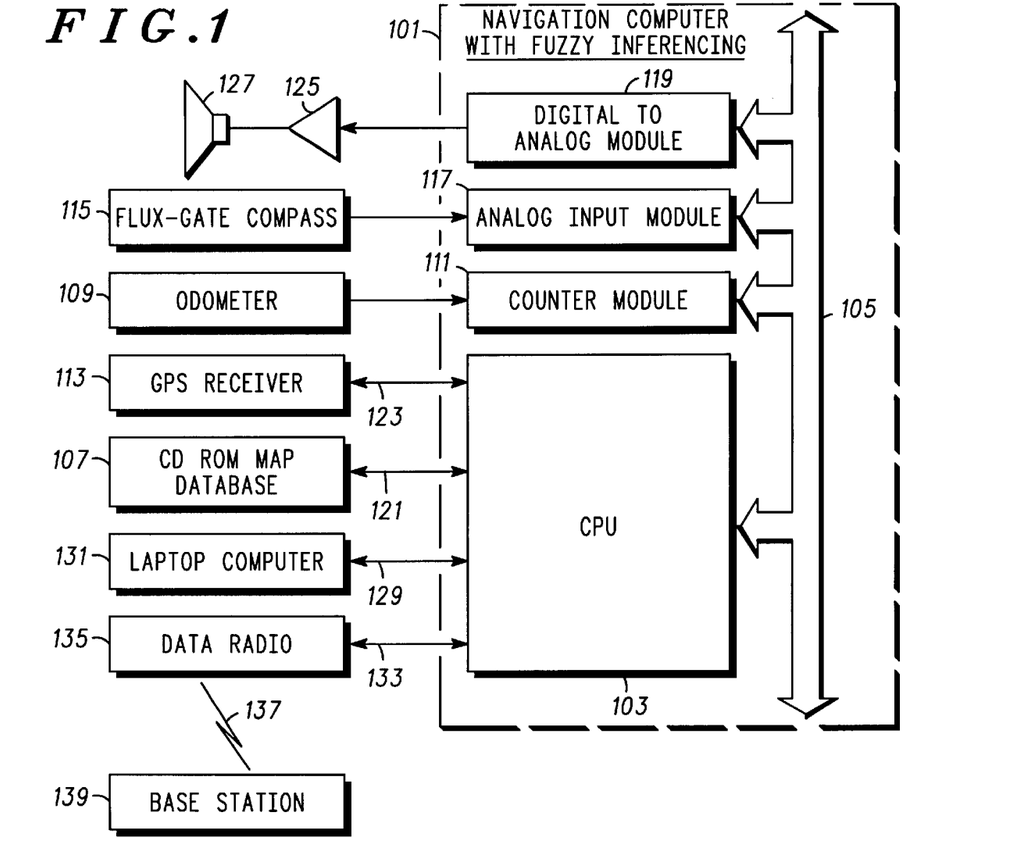
FIG. 1 illustrates a block diagram of a navigation computer with fuzzy inferencing providing a physical platform, as described in a preferred embodiment.

Referring to FIG. 1 we illustrate a physical platform for the navigation computer with fuzzy inferencing 101, by applying a MVME147SA-2 VME computer board, available from Motorola Inc., Microcomputer Division Marketing Department, MS DW283, 2900 South Diablo Way, Tempe, Ariz. 850282. This single board computer, or CPU 103 has a 32 Mhz 68030 with a 68882 floating point coprocessor, 32 Mb of DRAM, and a battery backed real time clock calendar. A VME bus 105 is a conduit applied to couple various other functions to the CPU 103. Other microprocessor types and platforms are suitable for this task as well.

We couple the SCSI bus interface 121 from the CPU 103 to the CDROM 107, a CDU-541 available from Sony, Computer Peripheral Products Company, Sony Corporation of America 12337 Jones Road Suite 200-17 Houston, Tex. 77070. The CDROM 107 reads a map database from an optical disk. Henceforth the combination of the CDROM and the map database will be referred to as a map database and by denoted by 107.

We then couple a data radio 135 to the CPU 103, via an RS-232C link 133, as an alternative, or additional mechanism for receiving route attribute information such as active traffic information. This radio 135 is the Coverage Plus Simplex 35 Watt Radio, Model Number D45AHA5GB1AK, available from Motorola, Inc. Communications Sector 1303 Algonquin Road, Schaumburg, Ill. 60196. This radio 135 communicates with the base station system 139, via airwaves 137. The base station system 139 broadcasts relevant route attribute information, such as traffic congestion to the data radio 135. Of course, other data radio's and systems such as the European Radio Data Service, and other Traffic Information Center infrastructures can be applied.

And finally a portable PC, or laptop computer 131 is coupled to the CPU 103 through an RS-232C port, 129. This laptop computer 131 is applied to receive input from the vehicle operator, or driver, and display relevant navigation information. An Apple Macintosh PowerBook 170, available from Apple Computer Inc., 20525 Mariani Avenue, Cupertino, Calif. 95014 is applied. It's interesting to note that given the laptop computer as an input mechanism, the driver can receive traffic congestion information from a voice radio, or observation, and enter it into the system to augment other route attribute information.

The CPU 103 runs the compiled inferencing software developed on an IBM PC host computer using software available from Togai Infralogic, Inc. 30 Corporate Park, Suite 107 Irvine, Calif. 92714. This software is titled the Fuzzy C development system. Once the fuzzy sets, defined by membership functions, and fuzzy rules are derived using the IBM PC host, the output of the Fuzzy C development system is a standard ANSI C source code. This source code is then compiled by using the M68NNTBGHC SYSTEM V/68 GREEN HILLS C-68000 Compiler, available from Motorola Inc., Microcomputer Division Marketing Department, MS DW283, 2900 South Diablo Way, Tempe, Ariz. 850282. The output of the compiler is then loaded onto the CPU 103 for application execution. Of course, other embedded software emulations can be used.

Alternative fuzzy inferencing system platforms include fuzzy microcontroller circuits, fuzzy coprocessors, analog computational circuits, digital computer circuits, optical computers, spatial light modulators and holograms to name a few.

In the preferred embodiment the laptop computer 131 is the mechanism by which the driver inputs the trip origin and trip destination information as well as driver preference information. Of course, a wide variety of input mechanisms, including a voice input mechanism or other specialized devices, meeting the intent of the laptop computer 131, can be deployed. The navigation computer with fuzzy inferencing 101 reads the trip origin location and trip destination location from the laptop computer 131. The navigation computer with fuzzy inferencing 101 next queries the map database 107 seeking out all the possible routes between the trip origin and the trip destination. As described earlier, the route attributes are represented in a digital map database that includes congested travel time and uncongested travel time and can include historical route congestion, and concentration intensity. Of course, other attributes can be assigned to the routes in the map database 107. For instance, if the routes are hilly, during inclement weather, the driver can prefer to avoid those routes. Another example of a route attribute, is that of a bad neighborhood, or a route with a restaurants specializing in Lebanese cuisine, or a route with a difficult left turn on a Friday afternoon at 5 PM, or a route with sports bars. Some, or all of these route attributes can be important to the preferences selected by a specific driver. Of course, as an alternative driver operates the vehicle she can choose to input alternative preferences. Note that route attributes such as congestion and or concentration intensity have historically pre-estimated values stored in the map database. Alternatively these attributes can be updated at run time through the data radio 135 and base station 39.

Figures 5, 6:
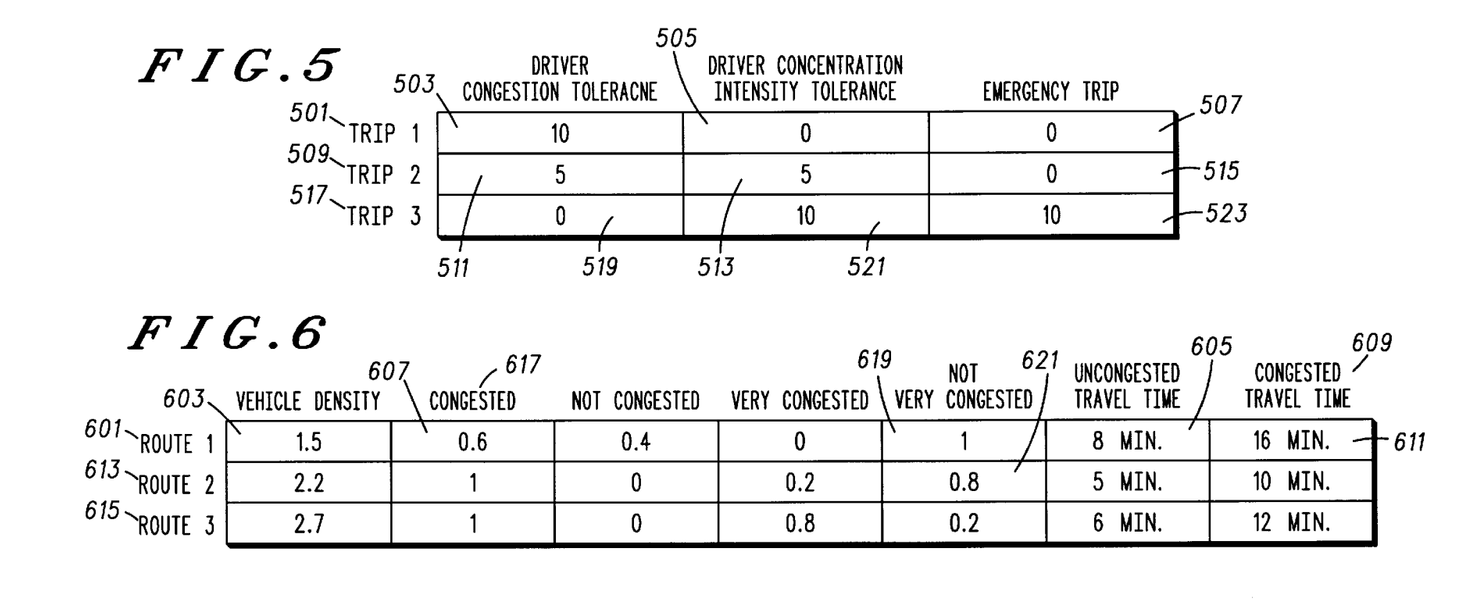
FIG. 5 illustrates a table of driver preferences, or tolerances, for a variety of trip scenarios, as described in a preferred embodiment.
FIG. 6 illustrates a table of truth values, for a variety of route scenarios, as described in a preferred embodiment.

Viewing FIG. 5, we see three different trips illustrated with different driver preferences. These can be input by the same driver preparing for three different trips with a variety of preferences, or input by different drivers with different preferences. As previously mentioned, the driver inputs his preferences on the laptop computer 131 for the various categories illustrated including tolerance to congestion, tolerance to concentration intensity and emergency trip. Of course, other attributes as described before can be of interest to the driver and input at this time. In the preferred embodiment, the driver inputs a number between zero and 10 indicating his preference. For the case of Trip 1 501, the driver has selected a congestion tolerance of 10, 503. This means that the driver has a high tolerance to congestion. The driver has selected a zero tolerance to concentration intensity 505, and a zero value for emergency trip 507. These preferences indicate that the driver is not interested in a route that requires a great deal of concentration to traverse and also that this trip is not an emergency. From this profile of preferences, we can see that the driver prefers no distraction, other than a bumper-to-bumper traffic jam and has plenty of time to drive. In Trip 2 509, the driver has selected a congestion tolerance of 5 511, a concentration intensity tolerance of 5 513, and an emergency trip preference of zero, 515. We can see from this profile that the driver has average tolerance to Congestion and Concentration Intensity and has plenty of time to drive. In Trip 3 517, the driver has selected a congested tolerance of zero 519, a concentration intensity tolerance of 10 521, and an emergency trip preference of 10, 523. We can see from Trip 3 517 profile, that the driver is in a hurry to get from his trip origin to his trip destination, does not want to drive on a congested route, and doesn't mind a concentration intensive route.

As we continue our description, we will employ Trip 2 509 and its attendant driver preferences while considering our example of route selection.

Figure 2:
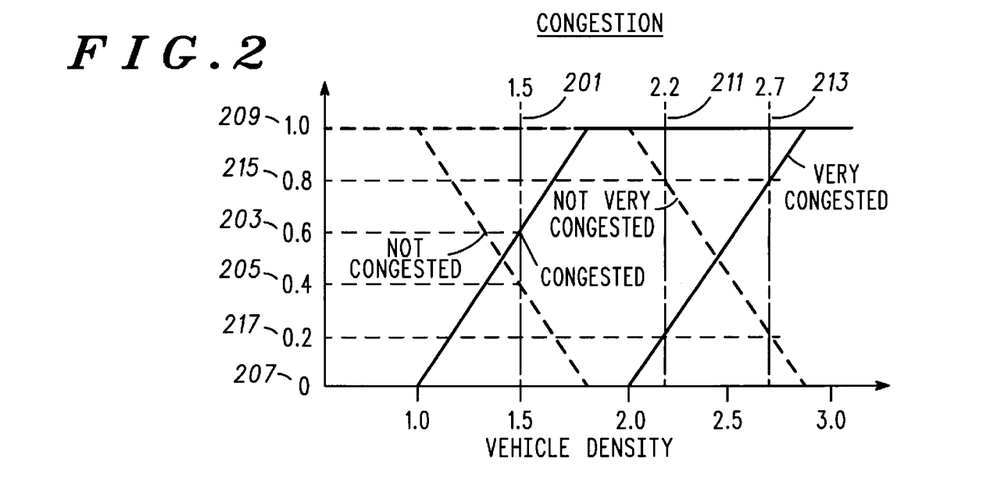
FIG. 2 illustrates a fuzzy set describing Congestion as described in a preferred embodiment.

In FIG. 6 we illustrate various attributes for the three routes found in the map database 107 for our trip example. Some of these attributes are truth values from fuzzy sets and some are computed. Considering Route 1 601, when the map database 107 is queried, it returns an average vehicle density attribute of 1.5, 603. Turning to FIG. 2, we find a fuzzy set describing the universe of discourse for all congestion attributes.

While considering our vehicle density attribute 1.5 201 we find a truth value of 0.6 203 in the Congested fuzzy set, a truth value of 0.4 205 in the Not Congested fuzzy set, a truth value of zero 207 in the Very Congested fuzzy set, and a truth value of 1.0 209 in the Not Very Congested fuzzy set. Referring to FIG. 6 we see these truth values in table form. When queried, the map database 107 also provided a historically average value for uncongested travel time of 8 minutes 605 and the historically average congested travel time 16 minutes, 611.

The truth values and travel times for Route 2 613 and Route 3 615 are derived in the same manner as described for Route 1, 601.

With the aid of TABLE 1, which shows a descriptive form of the fuzzy rule set employed in the preferred embodiment, we can further understand which fuzzy rules are selected in this case.

Note that the items highlighted by italics are references to truth values used in preceding antecedents of the same rule, the items Capitalized are membership functions representing fuzzy sets and the items in UPPERCASE are formal linguistic operators for describing rules.

TABLE 1

Figure 7:
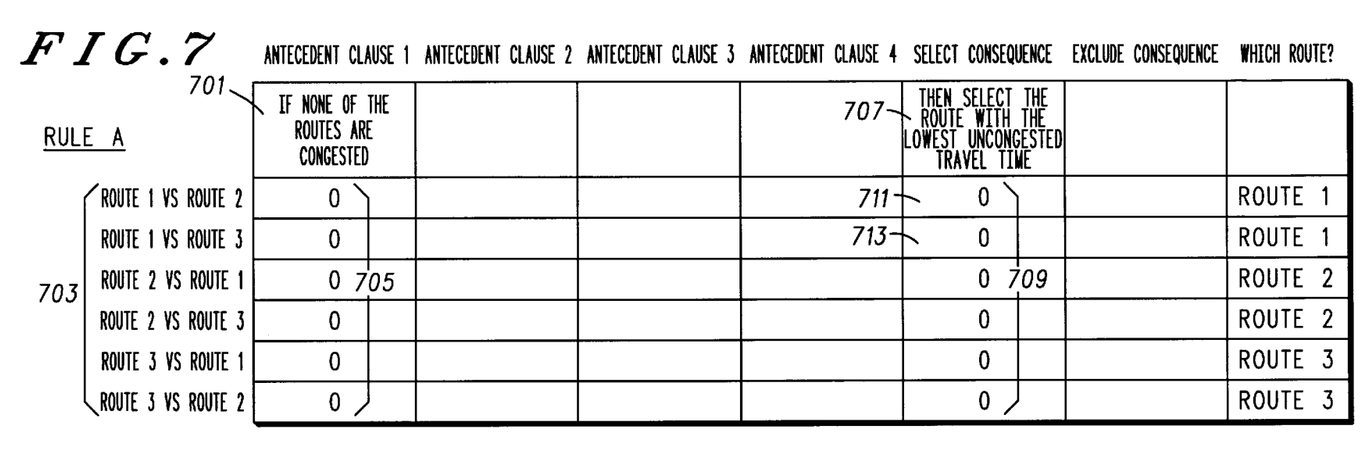
FIG. 7 illustrates an inference table for Rule A from TABLE 1, for a variety of route scenarios, as described in a preferred embodiment.

A. IF none of the routes are Congested
    THEN select the route with the lowest uncongested travel time
B. IF some of the routes are Very Congested
    AND IF there are routes that are Not Very Congested
    THEN exclude the very congested routes from the selection
C. IF a route IS Congested
    AND IF an alternate route IS Not Congested
       AND IF the derived travel time of the congested route IS Shorter
          AND IF the driver has a tolerance to Congestion
    THEN select the congested route
D. IF a route IS Congested
    AND IF an alternate route IS Not Congested
    AND IF the trip IS not an emergency trip
       AND IF the driver has no tolerance To Congestion
    THEN select the not congested route After classifying the route attributes and the driver preferences into the fuzzy sets, yielding the truth values illustrated in FIG. 6, the navigation computer with fuzzy inferencing 101 next selects at least one fuzzy rule from TABLE 1. Starting with Rule A of TABLE 1, further illustrated in the form of a fuzzy inferencing table in FIG. 7, we consider the first antecedent clause 701, and whether or not the compared routes 703 select this clause 701. As we denoted in FIG. 6 column 617, no two routes are not fully Congested, and therefore, this clause does not fire, resulting in zero truth values 705. As the antecedent clause 1 701 resulted in zero truth values 705 the consequence clause 707 also yields zero truth values 709.

Figure 8:
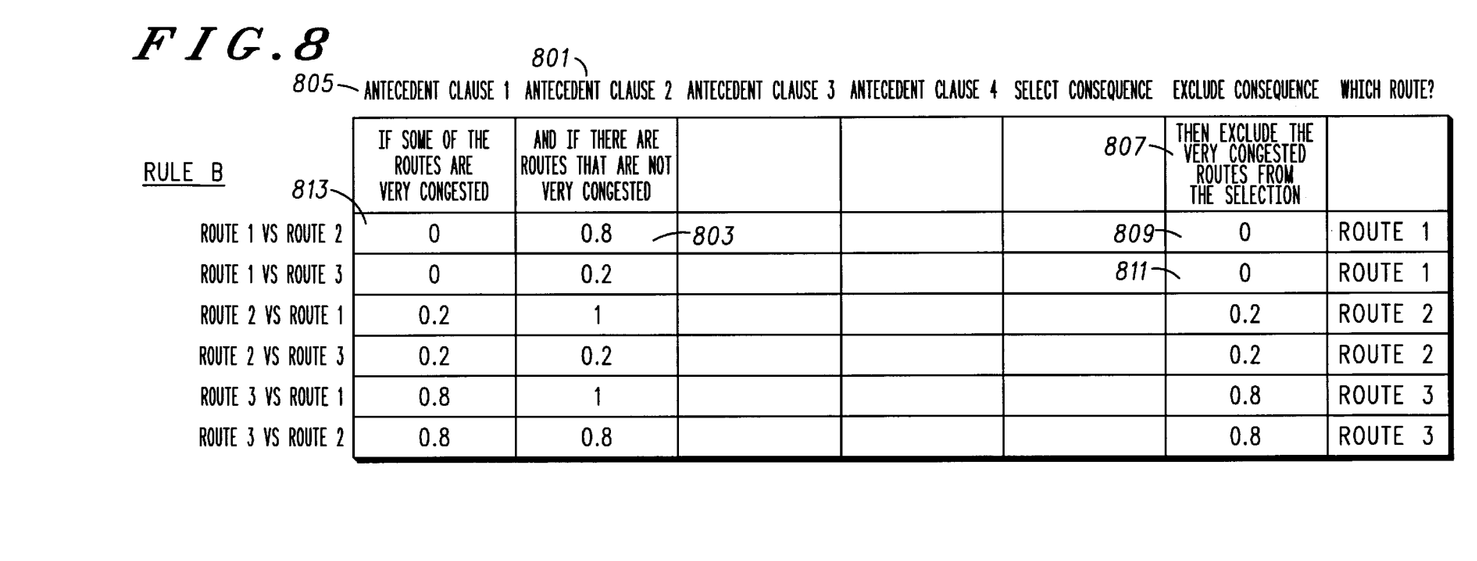
FIG. 8 illustrates an inference table for Rule B from TABLE 1, for a variety of route scenarios, as described in a preferred embodiment.

We next consider Rule B, illustrated in fuzzy inferencing table in FIG. 8. We again consider the comparison of routes against the antecedent clauses. We find that antecedent clause 2 of Rule B 801 has a truth value of 0.8, 803. This truth value 803 is retrieved from the table in FIG. 6 as the Not Very Congested truth value of Route 2 0.8, 621. While comparing Route 1 versus Route 2, antecedent clause 1 805 yields a zero value from the table in FIG. 6 as a Very Congested truth value for Route 1. Applying the simplest fuzzy AND operator the consequence clause 807 also has a zero truth value as the minimum of zero 813, and 0.8 803, is zero, 809.

The fuzzy inferencing table in FIG. 8 is then completed as described earlier.

Figure 4:
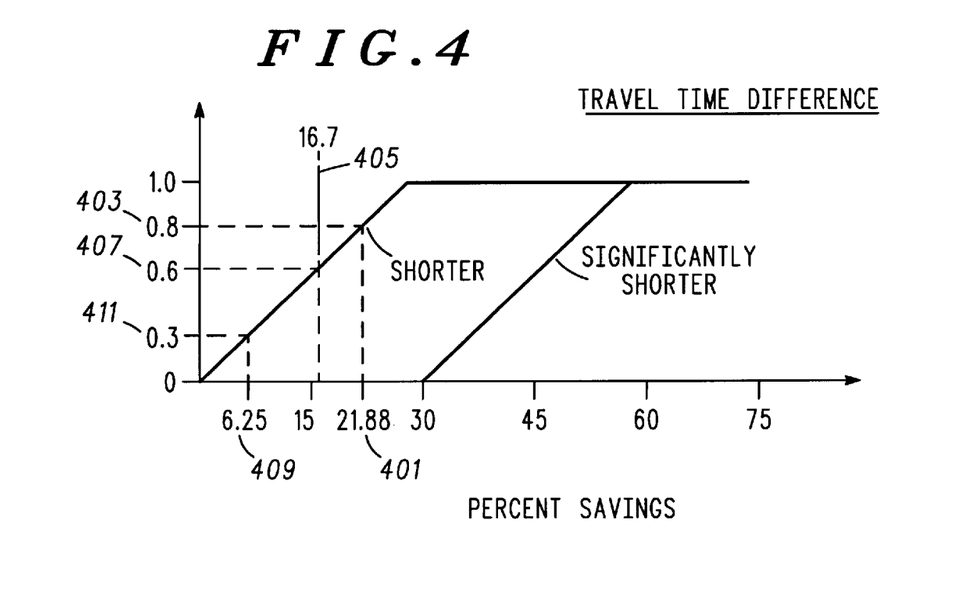
FIG. 4 illustrates a fuzzy set describing Travel Time difference, as described in a preferred embodiment.
Figure 9:
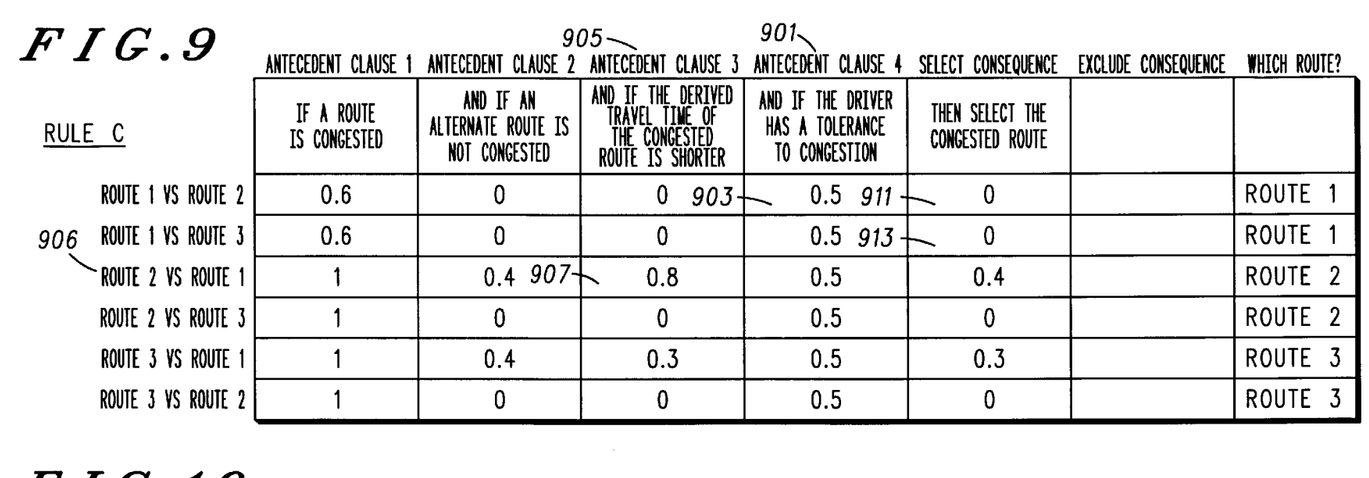
FIG. 9 illustrates an inference table for Rule C from TABLE 1, for a variety of route scenarios, as described in a preferred embodiment.

In FIG. 9 we find Rule C from TABLE 1 illustrated in fuzzy inferencing table form. This table is filled out with the same procedure as described for the table illustrated in FIG. 8. It's interesting to note here the inclusion of driver preferences in antecedent clause number 4, 901. The truth value 903 for driver tolerance to congestion of 0.5 903 is derived by normalizing the driver congestion tolerance selection of 511, between a value from zero to 1, in this case, by dividing by 10. While deriving the truth values for antecedent clause 3 905, we need to invoke a crisp calculation then a fuzzification by a table look-up process. The crisp calculation is as follows.

$$\% \text{ Savings} = \frac{\left(\begin{array}{c}(((CTT_x - UCTT_x)*C_x) + UCTT_x) - \\ (((CTT_y - UCTT_y)*C_y) + UCTT_y)\end{array}\right)}{(((CTT_x - UCTT_x)*C_x) + UCTT_x)}$$

where:
    $CTT_x$ is the Congested Travel Time for the not congested route in the antecedent clause 2 in Rule C
    $UCTT_x$ is the Uncongested Travel Time for the not congested route in the antecedent clause 2 in Rule C
    $C_x$ is the Congestion truth value for the not congested route in the antecedent clause 2 in Rule C
    $CTT_y$ is the Congested Travel Time for the the congested route in the antecedent clause 1 in Rule C
    $UCTT_y$ is the is the Uncongested Travel Time the congested route in the antecedent clause 1 in Rule C
    $C_y$ is the Congestion truth value for the congested route in the antecedent clause 1 in Rule C For the case of Route 2 versus Route 1 906, we calculate a 21.88% savings. Referring to FIG. 4, we see that a 21.88% savings 401 intersects with a shorter travel time difference fuzzy set to a truth value of 0.8, 403. We then insert this truth value of 0.8 403 into our fuzzy inferencing table FIG. 9 as a truth value of 0.8, 907. This crisp calculation then a fuzzification by a table look-up is repeated for the other cases in order to complete the fuzzy inferencing table for Rule C in FIG. 9.

Figure 10:
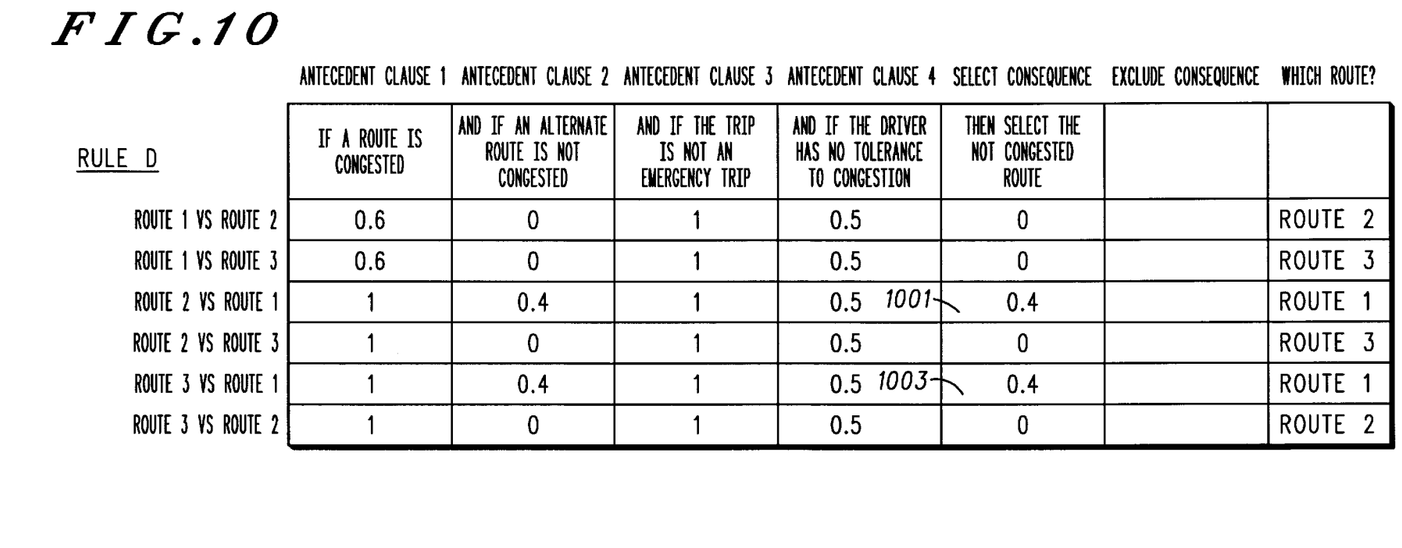
FIG. 10 illustrates an inference table for Rule D from TABLE 1, for a variety of route scenarios, as described in a preferred embodiment.

In FIG. 10 we find fuzzy Rule D from TABLE 1 illustrated in fuzzy inferencing table format. This table was filled out in the same manner as the tables illustrated in FIGS. 7, 8, and 9, by classifying the fuzzy variable into the appropriate fuzzy set.

Figure 11:
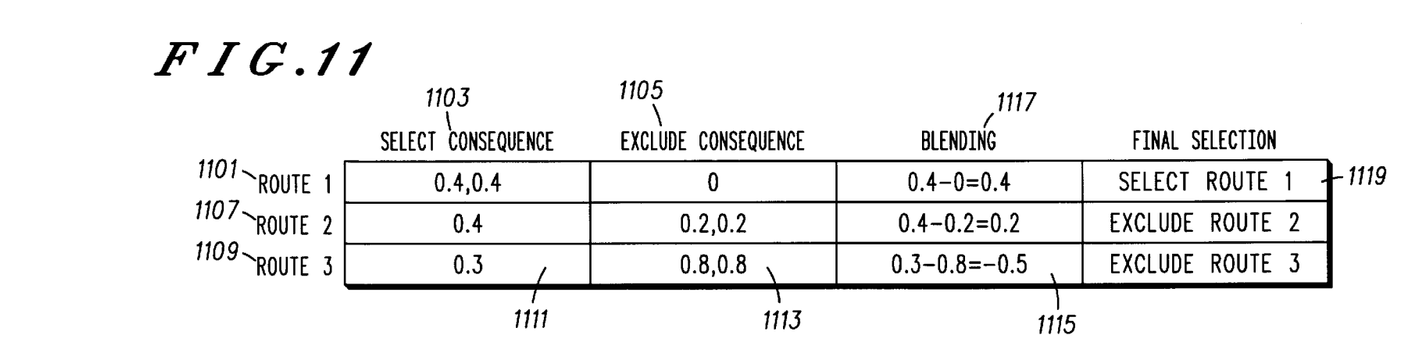
FIG. 11 illustrates a table for final blending and Selection or Exclusion of routes based on truth values, as described in a preferred embodiment.

The table in FIG. 11, illustrates the blending process chosen for the preferred embodiment. Of course, it would be obvious to one of ordinary skill in the art to use other blending processes that satisfy the intent of this discussion. We blend, by first considering Route 1 1101 and the Select Consequences from the fuzzy rules. Rule A in FIG. 7 yielded a zero truth value for Selecting Route 1 711 713. Rule B in FIG. 8 also yielded a zero truth value for Selecting Route 1 809 811. Fuzzy Rule C also yielded zero truth values for Route 1 911 913. Fuzzy Rule D yields a Select Consequence truth value of 0.4 1001, and a Select Consequence truth value of 0.4, 1003. These values are entered in the Select Consequence column in FIG. 11, 1103. Both the Select Consequence column 1103 and the Exclude Consequence column 1105 are completed in the same manner for Route 1 1101, Route 2 1107, and Route 3, 1109. We then blend by selecting a maximum Select Consequence truth value and subtracting the maximum Exclude Consequence truth value yielding a final truth value. Therefore, for Route 3 1109, we find a maximum Select Consequence value of 0.3 1111 and subtract a maximum Exclude Consequence truth value of 0.8 1113 yielding a blended truth value of –0.5, 1115. The Blending column 1117 is completed in the same manner for Route 1 1101 and Route 2, 1107. We then complete the defuzzification process by selecting the route with the highest numeric truth value difference, in this case Route 1 1101 is selected 1119.

In this example we used the Congested attribute from the map database 107. Various driver attributes including tolerance to congestion, tolerance to concentration intensity, and emergency trip, all provided by the driver through the laptop computer 131. Of course, we could as described earlier, combine the Congested attribute information from the data radio 135 and the base station 139, with the map database Congested attribute.

Figure 3:
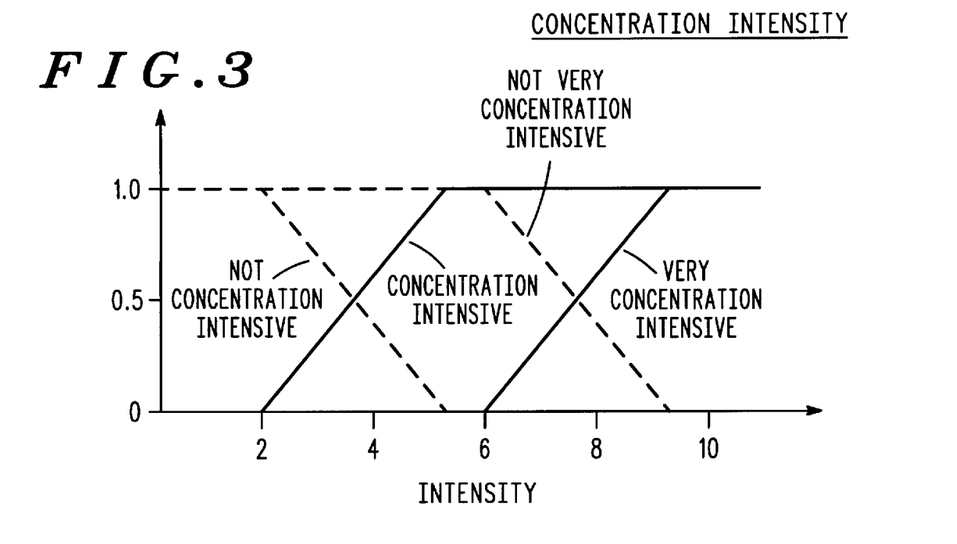
FIG. 3 illustrates a fuzzy set describing Concentration Intensity, as described in a preferred embodiment.

In FIG. 3 we illustrate a fuzzy set describing the universe of discourse for the Concentration Intensity route attribute. In TABLE 2 we introduce a fuzzy rule set considering concentration intensity as a route attribute. Considering these rules and sets will further refine the convenience of the route selection process.

TABLE 2

A. IF none of the routes are Concentration Intensive
    AND IF none of the routes are Congested
    THEN select the route with the lowest uncongested travel time
B. IF some of the routes are Very Concentration Intensive
    AND IF there are routes that are Not Very Concentration Intensive
        AND IF the very concentration intensive routes do not offer Significantly Shorter travel time
            AND IF the remaining routes are Not Very Congested
    THEN exclude the very concentration intensive routes from the selection
C. IF the route IS Concentration Intensive
    AND IF an alternate route IS Not Concentration Intensive
        AND IF the concentration intensive route has Shorter travel time
            AND IF the driver has a tolerance to concentration intensity
    THEN select the concentration intensive route
D. IF a route IS Concentration Intensive
    AND IF an alternate route IS Not Concentration Intensive
        AND IF the trip IS not an emergency trip
            AND IF the driver has a no tolerance to concentration intensity
    THEN select the not concentration intensive route In conclusion, we have illustrated a system for planning a preferred, or more convient route by taking into account route attributes as well as driver preferences.

What is claimed is:

1. A vehicle route planning system comprising:
   means for receiving information identifying a trip origin location and a trip destination location;
   map means, responsive to said received information, for identifying at least a first route and a second route connecting said identified trip origin location and said identified trip destination location;
   means for assigning a first attribute to said first route and a second attribute to said second route, said attributes associated with certain route characteristics;
   means for driver preference matching, said means for providing a first driver preference attribute output dependent on ranking the first attribute assigned to said first route by predetermined driver preferences, and providing a second driver preference attribute output dependent on ranking the second attribute assigned to said second route by said predetermined driver preferences; and
   another means for driver preference matching, said another means for selecting a preferred route from said first and second routes dependent on selecting a higher route selection score of a first route selection score and a second route selection score, wherein the first route selection score is dependent on ranking said first driver preference attribute output by other predetermined driver preferences, and the second route selection preference score is dependent on ranking said second driver preference attribute output by the other predetermined driver preferences.

2. A vehicle route planning system in accordance with claim 1 wherein said first attribute further comprises traffic congestion information associated with said first route.

3. A vehicle route planning system in accordance with claim 1 wherein said first attribute further comprises traffic concentration intensity information associated with said first route.

4. A vehicle route planning system in accordance with claim 1 wherein said means for assigning further comprises a radio transmitter which transmits said first attribute.

5. A vehicle route planning system in accordance with claim 4 further comprising a radio receiver for receiving said first attribute transmitted by said radio transmitter.

6. A system in accordance with claim 1 wherein said first and second attributes are associated with different route characteristics.

7. A system in accordance with claim 1 wherein said means for driver preference matching provides a plurality of first driver preference attribute outputs dependent on ranking the first attribute assigned to said first route by said predetermined driver preferences, and provides a plurality of second driver preference attribute outputs dependent on ranking the second attribute assigned to said second route by said predetermined driver preferences; and
   wherein said another means for driver preference matching selects a preferred route from said first and second routes dependent on selecting a higher route selection score of said first route selection score and said second route selection score, wherein the first route selection score is dependent on ranking said plurality first driver preference attribute outputs by said other predetermined driver preferences, and the second route selection preference score is dependent on ranking said plurality of second driver preference attribute outputs by said other predetermined driver preferences.

8. A vehicle route planning method comprising the steps of:
   receiving information identifying a trip origin location and a trip destination location;
   identifying at least a first route and a second route connecting said identified trip origin location and said identified trip destination location;
   assigning a first attribute to said first route and a second attribute to said second route, said attributes associated with certain route characteristics;
   providing a first driver preference attribute output dependent on ranking the first attribute assigned to said first route by predetermined driver preferences, and providing a second driver preference attribute output dependent on ranking the second attribute assigned to said second route by said predetermined driver preferences; and
   selecting a preferred route from said first and second routes dependent on selecting a higher route selection score of a first route selection score and a second route selection score, wherein the first route selection score is dependent on ranking said first driver preference attribute output by other predetermined driver preferences, and the second route selection preference score is dependent on ranking said second driver preference attribute output by the other predetermined driver preferences.

9. A vehicle route planning method in accordance with claim 8 wherein said step of assigning a first attribute further comprises assigning traffic congestion information associated with said first route.

10. A vehicle route planning method in accordance with claim 8 wherein said step of assigning a first attribute further comprises assigning traffic concentration intensity information associated with said first route.

11. A vehicle route planning method in accordance with claim 8 wherein said step of assigning a first attribute further comprises transmitting a radio signal embodying said first attribute.

12. A vehicle route planning method in accordance with claim 8 wherein said step of assigning a first attribute further comprises receiving a radio signal embodying said first attribute.

13. A vehicle route planning system comprising:

means for receiving information identifying a trip origin location and a trip destination location;

map means, responsive to said received information, for identifying at least a first route and a second route connecting said identified trip origin location and said identified trip destination location;

means for assigning a first attribute to said first route and a second attribute to said second route;

means for driver preference matching, said means for providing a first driver preference attribute output dependent on ranking the first attribute assigned to said first route by predetermined driver preferences, and providing a second driver preference attribute output dependent on ranking the second attribute assigned to said second route by said predetermined driver preferences; and means for selecting a preferred route from said first and second routes dependent on ranking said first driver preference attribute output and said second driver preference attribute output, wherein said ranking is dependent on other predetermined driver preferences.

14. A vehicle route planning system comprising:

means for receiving information identifying a trip origin location and a trip destination location;

map means, responsive to said received information, for identifying at least a first route and a second route connecting said identified trip origin location and said trip destination location;

means for assigning a first attribute to said first route and a second attribute to said second route;

first means for driver preference matching, said first means for providing a first driver preference attribute output dependent on ranking the first attribute assigned to said first route by first predetermined driver preferences, and providing a second driver preference attribute output dependent on ranking the second attribute assigned to said second route by said first predetermined driver preferences;

second means for driver preference matching, said second means for providing a first route selection preference score and a first route exclusion preference score, wherein each of the first route scores are dependent on ranking said first driver preference attribute output by second predetermined driver preferences, and for providing a second route selection preference score and a second route exclusion preference score, wherein each of the second route scores are dependent on ranking said second driver preference attribute output by said second predetermined driver preferences; and third means for driver preference matching, said third means for selecting a preferred route from said first and second routes dependent on assigning a higher preference coefficient to a higher of both of the first route selection preference score and the second route selection preference score, and a assigning a lower preference coefficient to a higher of both of the first route exclusion preference score and the second route exclusion preference score.

* * * * *